United States Patent [19]

Schaphorst et al.

[11] Patent Number: 4,571,632
[45] Date of Patent: Feb. 18, 1986

[54] ALTERNATE LINE INTERPOLATION METHOD AND APPARATUS

[75] Inventors: Richard A. Schaphorst, Jenkintown, Pa.; Charles D. Bodson, Arlington, Va.

[73] Assignee: The United States of America as represented by the Secretary of the Army, Washington, D.C.

[21] Appl. No.: 526,763

[22] Filed: Aug. 26, 1983

[51] Int. Cl.$^4$ ............................................. H04N 7/12
[52] U.S. Cl. ..................................... 358/260; 358/136
[58] Field of Search ............... 358/133, 135, 136, 138, 358/260, 261; 375/27; 340/727, 728

[56] References Cited

U.S. PATENT DOCUMENTS

| | | | |
|---|---|---|---|
| 3,347,981 | 10/1967 | Kagan et al. | 178/5 |
| 3,804,975 | 4/1974 | Abe | 178/6 |
| 3,956,578 | 5/1976 | de Loye et al. | 178/6 |
| 4,193,092 | 3/1980 | Stoffel | 358/136 |
| 4,316,222 | 2/1982 | Subramaniam | 358/261 |

FOREIGN PATENT DOCUMENTS 52-44112  4/1977  Japan ................................. 358/260

Primary Examiner—Joseph A. Orsino, Jr.
Attorney, Agent, or Firm—John H. Raubitschek; Arthur I. Spechler; Werten F. W. Bellamy

[57] ABSTRACT

A method and apparatus are provided for data compression in a digital facsimile document transmission system. In accordance with the method, only alternate scan lines are transmitted, i.e., every other line is deleted in transmission, and at the receiver, the missing scan lines are interpolated from the transmitted data. This compression technique provides a fixed compression ratio of 2 to 1 regardless of the complexity of the input document. The interpolation method relies on comparing, for each picture element to be interpolated, the colors of one or more pairs of adjacent picture elements of the transmitted scan lines and making a decision as to the color of the picture element to be interpolated on this basis.

8 Claims, 4 Drawing Figures

ALTERNATE LINE INTERPOLATION METHOD AND APPARATUS

FIELD OF THE INVENTION

The present invention relates to an interpolation method and apparatus for providing data compression or image enhancement.

BACKGROUND OF THE INVENTION

Compression techniques are commonly used in digital facsimile systems for minimizing the time required for transmission of documents. Source coding—a technique which reduces the redundancy inherent in the input document—is the most common technique used for this purpose. Examples of source coding methods include the Modified Huffman code and the modified READ code. A fundamental characteristic of source coding is that, assuming no transmission errors, the output document produced is similar to the input digital image, i.e., no approximations or degradation occurs relative to the original digitized image. Another characteristic of source coding is that the compression ratio provided is highly dependent upon the complexity of the input document so that complex documents require substantially more transmission time than simple documents containing little information.

A further prior art technique of particular interest here is that disclosed in U.S. Pat. No. 4,193,092 (Stoffel). The Stoffel patent discloses a image interpolation system wherein analog data pixels are sampled and held so as to produce a "box car" wave representative of the image data. Differences in wave height are bridged by linear interpolation, with frequency enhancement being imposed at the junctures of the bridges. The modified wave is processed to provide an image pixel stream comprised of both original image pixels and one or more interpolated image pixels therebetween. One or more intermediate image lines are interpolated by comparing binary image data to produce an address used to identify a specific image pixel pattern from multiple image patterns stored in a look-up table in memory. The image pixel pattern identified is used to form the interpolated line or lines. A further patent of interest in this respect is U.S. Pat. No. 3,956,578 (de Loye et al) which relates to compression techniques for facsimile systems for picture transmission.

Other patents of more general interest include U.S. Pat. Nos. 3,347,981 (Kagan et al); 3,804,975 (Abe); 3,950,609 (Tanaka et al); 4,086,620 (Bowen et al); 4,096,527 (Furata); and 4,316,222 (Subramanian).

SUMMARY OF THE INVENTION

In accordance with the present invention, a method and apparatus of digital facsimile transmission and reception are provided wherein only alternate line scans are transmitted, i.e., every other line scan is deleted from the transmission, and estimates, based on the transmitted scans, are made of the brightness of output pels which are not transmitted so that the missing scan lines are interpolated at the receiver between the transmitted scans. This approach provides a fixed two to one compression ratio regardless of the complexity of the transmitted document. Further, in contrast to the interpolation method of the abovementioned Stoffel U.S. Pat. No. (4,193,092) wherein the range of interpolation is limited in the sense that a specific limited number of picture elements is used to interpolate picture elements in an intervening line, the range of interpolation is unlimited for the present invention. In addition, in contrast to the Stoffel technique wherein a look-up table is used to determine interpolated picture element values, the present invention is concerned with a specific approach in determining the values of the interpolated picture elements. Moreover, the Stoffel patent is specifically concerned with a particular implementation technique for interpolation wherein the transmitted data is used as an address in retrieving the interpolated picture element or pel. Such a narrow approach has obvious disadvantages and the general approach of the present invention is clearly distinguishable therefrom.

In accordance with a preferred embodiment of the invention, a method and apparatus of digital facsimile transmission and reception are provided which involve scanning the image to be transmitted so as to produce a plurality of scan lines for transmission; transmitting only alternative scan lines of the scanned image so that every other scan line is missing from the transmitted image; and receiving the transmitted scan lines and interpolating the missing scan lines between the transmitted scan lines. The interpolating step itself comprises comparing, for each picture element of the scan line to be interpolated, the colors, e.g., black or white, of the directly adjacent picture elements of the two adjacent transmitted scan lines between which the missing line is to be interpolated. If the colors of the directly adjacent picture elements are the same, the interpolated picture element is interpolated as that color and the interpolation process is completed. If, on the other hand, the colors of the directly adjacent picture elements are different, a comparison is made of the individual picture elements of the next two adjacent pairs of picture elements of the adjacent transmitted scan lines on either side of the directly adjacent picture elements. If this comparison determines that the colors of the individual picture elements of either pair of these next adjacent pairs are the same, and the two pairs are not of opposite colors, the interpolated picture element is interpolated as that color and the interpolation process is ended. If, on the other hand, the individual picture elements of each pair of these next adjacent pairs are the same and the two pairs are of opposite color, the interpolated picture element is interpolated as a given color, e.g., white, and the process is again ended. However, if neither one of the pairs of these adjacent pairs of picture elements comprises picture elements of the same color, the two next most adjacent pairs of picture elements are compared and the foregoing steps are repeated until the picture elements of at least one pair of the picture elements in sequence measured from both sides of the directly adjacent picture elements are determined to be the same color. When this is determined, the interpolated picture element is interpolated in accordance with steps outlined above and, in particular, interpolated as that color unless, as noted above, the individual picture elements of both pairs are of the same color and the pairs themselves are of opposite color.

A similar method is used in image enhancement as explained below.

Other features and advantages of the present invention will be set forth in, or be apparent from, the detailed description of the preferred embodiments of the invention found hereinbelow.

DESCRIPTION OF THE PREFERRED EMBODIMENTS

Figure 1:
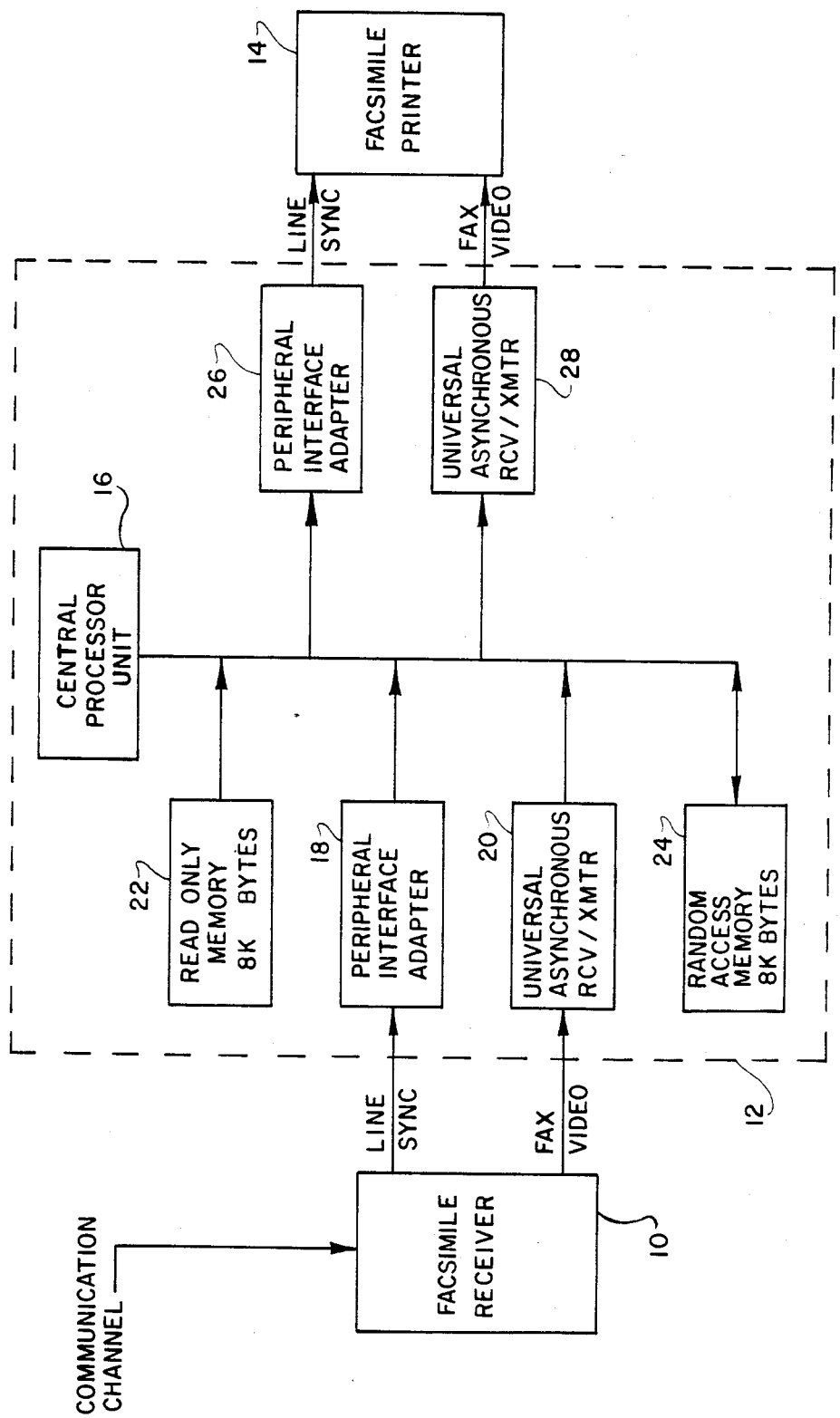
FIG. 1 is a block diagram of a digital facsimile receiver system incorporating the alternate line interpolator of the invention.

To place the invention in context with respect to a first aspect thereof, reference is made to FIG. 1 which is a block diagram of a preferred embodiment of a digital facsimile receiver system incorporating the alternate line interpolation of the invention. Before proceeding, it will be understood that a wide range of approaches can be taken in implementing the invention including both a non-programmable hardware approach and the microprocessor approach specifically illustrated in FIG. 1 and described below.

The system of FIG. 1 includes a facsimile receiver 10 for receiving a facsimile signal from a communication channel. A total of 1100 scan lines per page are typically received. The fasimile receiver 10 includes, as is conventional, the electronics portion of the facsimile output device which demodulates the received signal, decompresses the received signal and thereafter, in prior art devices, feeds the decompressed signal directly to the printer. In the embodiment of FIG. 1, an alternate line interpolation unit, generally denoted 12, is interposed between the facsimile receiver 10 and a facsimile printer 14.

The alternate line interpolator 12 does what its name implies, i.e., provides for interpolation of a line between each pair of scan lines received. Thus, if a total of 1100 scan lines per page is received as set forth above, a total of 2200 scan lines per page will be printed. In other words, for each scan line which is received, two lines are printed, viz, the transmitted line which is received (n) and the line which interpolated between line n and the previously transmitted line (n-1).

As set forth above, the alternate line interpolation unit 12 of the embodiment of FIG. 1 is implemented using a microprocessor as a central processor unit (CPU), denoted 16, which controls the flow of facsimile data from the facsimile receiver 10 to the facsimile printer 14 and, as described below, also performs the interpolation function. As illustrated the alternate line interpolator unit 12 also includes a peripheral interface adaptor (PIA) 18 connected to the "line synch" output of facsimile receiver 10 and a universal asynchronous receiver-transmitter (UART) 20 connected to the "fax video" output of facsimile receiver 10. These units are connected to CPU 16 together with a read only memory (RAM) 22 and a random access memory (ROM) 24. The CPU 16 is connected through a further peripheral interface adapter 26 to the "line synch" input of facsimile printer 14 and through a further universal asynchronous receiver-transmitter 28 to the "fax video" input of printer 14.

In operation, in typical facsimile systems a single scan line consists of 1,728 picture elements or bits. As each scan line is received by the alternate line interpolation unit 12 from facsimile receiver 10, the scan line is stored in the RAM 24. A typical microprocessor, e.g., a Motorola M68MM19A will contain 8K bytes of RAM. Thus, a microprocessor of this type includes sufficient storage capacity for the several scan lines required to perform the alternate line interpolation operation described below. Such a microcomputer will typically also contain 8K bytes of ROM (corresponding to ROM 22). ROM 22 is used to store the instructions for the CPU 16 and eight thousand bytes of ROM are more than adequate to store all instructions for the CPU. The peripheral interface adapters 18 and 26, and the universal asynchronous receivers/transmitters 20 and 28, are standard components and operate in a conventional manner.

Figure 2:
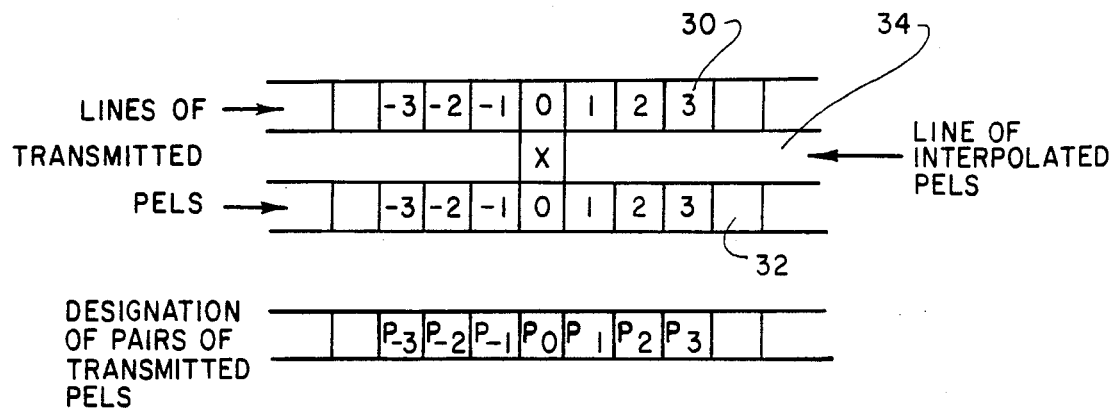
FIG. 2 is a diagrammatic representation of the transmitted line scan and a picture element to be interpolated therebetween, used in explanation of the method of the invention.

Referring now to FIG. 2, the alternate line interpolation method of the invention will now be considered in connection with a typical digital facsimile system of the general type described above, i.e., a type which scans, and prints, with the same resolution in both the horizontal and vertical directions. For example, the high resolution option for Group 3 facsimile equipment employs a resolution of 7.7 lines/mm in both directions. Each square in FIG. 2 represents one pixel or pel in the input and output images (e.g., 1/200 inch by 1/200 inch), as discussed above and illustrated in FIG. 2, every other line of pixels is transmitted and those lines which are not transmitted are interpolated at the receiver. In FIG. 2, the two lines of transmitted picture elements or pels are indicated at 30 and 32 while the line of interpolated picture elements or pels which lies therebetween is indicated at 34, with a specific pel to be interpolated being designated "x".

The first step of the interpolation process of the invention is to consider the pair of transmitted pels ($P_0$) which lie directly adjacent to the pel "x" in the line above and the line below. If the $P_0$ pels are both black, "x" is interpolated to be black. Similarly, if the $P_0$ pels are both white, "x" is interpolated white.

If the two $P_0$ pels are of different colors the adjacent pairs, i.e., the pairs $P_1$, $P_{-1}$, $P_2$, $P_{-2}$, etc., are examined to determine the color of the nearest pair where both pels are black or white, and the pel "x" is interpolated to the color of the nearest pair which is all black or all white. For example, if the pairs $P_{-2}$, $P_{-1}$, $P_0$ and $P_1$ all have pels of different colors but the pair of $P_2$ pels are of the same color, e.g., white, the pel "x" is interpolated as that color, i.e., white.

If opposite colors are found equidistant from "x" then "x" is arbitrarily interpolated to white. For example, where the pairs $P_0$, $P_{-1}$, and $P_1$ are of opposite colors, the pairs $P_2$ are black and the pair $P_2$ are white, x will be interpolated as white.

Although the interpolation method of the invention can clearly be implemented using a microprocessor, it will be understood that the method can also be easily implemented using conventional hard wired logic circuitry, with the basic components of such logic circuitry serving simply to sample and compare the various pairs of pels and as a result of these comparisons, to make decisions in the manner described above.

It will be appreciated that the method of the present invention will occasionally interpolate pixels incorrectly and thus differs from source coding in not reproducing the input digital image exactly. However, and, again, in contrast to source coding, the compression ratio is fixed at 2 to 1 regardless of the redundancy of the input image.

Figure 3:
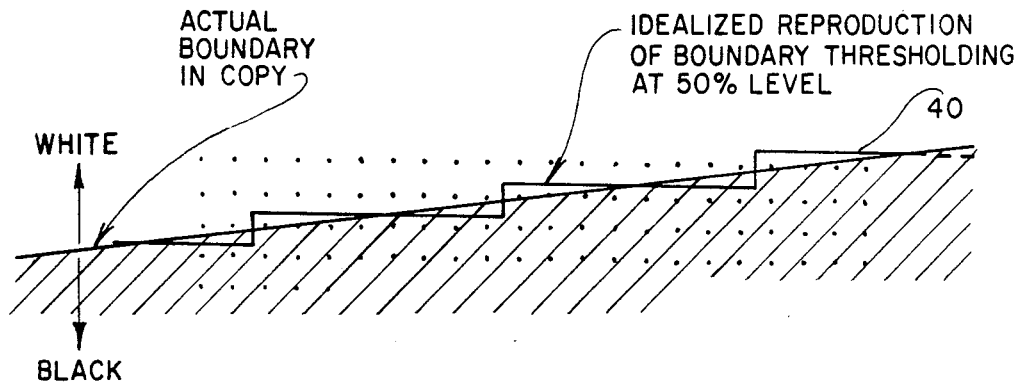
FIG. 3 is a diagram used in explanation of the use of the method of the invention in image enhancement.
Figure 4:
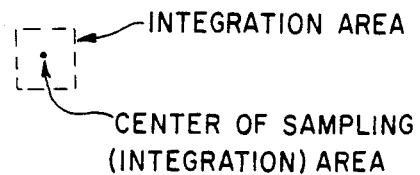
FIG. 4 is a detail of the diagram of FIG. 3.

In accordance with a further important aspect of the invention, a similar interpolation technique is used in what will be referred to as "image enhancement". Referring to FIG. 3, there is illustrated the typical "stair step" distortion produced in a conventional digital facsimile system when scanning a black-white edge which is nearly parallel to the scanning track. This ragged edge is quite visible to the naked eye and significantly reduces the acceptability of a digital facsimile. According to this aspect of the present invention, the appearance of the output image is improved by interpolating, or creating, twice as many scan lines on the output copy as were actually scanned and transmitted. The dots 40 in FIG. 3 represent the sample points of the matrix. The signal output at each point 40 is the integrated light energy over the corresponding cell. In FIG. 3, this area is considered to be the "contiguous cell" case. FIG. 4 illustrates the integration area and the center of the sampling (integration) area. By providing thresholding at a 50% level and using the method of the invention, the ragged stairstep distortion would be reduced 2 to 1 and the image thus made more pleasing to the eye. The interpolation method of the invention would automatically position the stairstep transitions on the interpolated lines in the optimum position, i.e., halfway between the steps on the above and below transmitted lines. In a specific example, this aspect of the invention can be used to "enhance" a received image which may be marginally acceptable, e.g., one containing 200 horizontal lines per inch (lpi) by 100 vertical lpi, by interpolating 200 vertical lpi and printing on a 200 vertical lpi printer rather than using a 100 lpi printer. The basic technique set forth above and the methods of implementation and the system parameters are the same as described above and only the application is different.

Although the invention has been described in connection with exemplary embodiments thereof, it will be understood by those skilled in the art that variations and modifications can be effected in these embodiments without departing from the scope and spirit of the invention.

We claim:

1. A method of digital facsimile transmission and reception, said method comprising:
    scanning the image to be transmitted so as to produce a plurality of scan lines for transmission;
    transmitting only alternative scan lines of the scanned image so that every other scan line is missing from the transmitted image;
    and receiving the transmitted scan lines and interpolating the missing scan lines between the transmitted scan lines;
    said interpolating step comprising: comparing for each picture element of the scan line to be interpolated, the colors of the directly adjacent picture elements of the two adjacent transmitted scan lines between which the missing line is to be interpolated, and
    (a) if the colors of the directly adjacent picture elements are the same, interpolating the interpolated picture element as that color; and (b) if the colors of the directly adjacent picture elements are different, comparing the individual picture elements of the next two adjacent pairs of picture elements of said adjacent transmitted scan lines on either side of the directly adjacent picture elements, and
    (i) if the colors of the individual picture elements of either pair of said next adjacent pairs are the same, and the two pairs are not of opposite colors, interpolating the interpolated picture element as that color;
    (ii) if the individual picture elements of each pair of said next adjacent pairs are the same and the two pairs are of opposite color, interpolating the interpolated picture element as a given color of said colors; and
    (iii) if neither one of the pairs of said adjacent pairs of picture elements comprises picture elements of the same color, comparing the picture elements of the two next most adjacent pairs of picture elements and repeating steps (i) to (iii) until at least one pair of the adjacent picture elements measured in sequence from the directly adjacent picture elements on both sides thereof is determined to comprise picture elements of the same color, and thereafter interpolating the interpolated picture element in accordance with steps (i) and (ii).

2. A method of digital facsimile transmission and reception as claimed in claim 1, further comprising printing, using a facsimile printer, the output produced by said interpolation step.

3. A method of digital facsimile transmission and reception as claimed in claim 1 wherein said transmitted image is received by a facsimile receiver and outputs from receiver are transmitted to a central processor unit for preforming said interpolating step, outputs from said central processor unit being transmitted to a facsimile printer for printing thereby.

4. A method of enhancing digital output image, said method comprising:
    interpolating additional scan lines between the scan lines of a received digital image to produce an interpolated image and printing out the interpolated image using a printer which prints at a line per inch density corresponding to that of the interpolated image;
    said interpolating step comprising: comparing for each picture element of each additional scan line to be interpolated, the colors of the directly adjacent picture elements of the two adjacent transmitted scan lines between which the addition line is to be interpolated, and
    (a) if the colors of the directly adjacent picture elements are the same, interpolating the interpolated picture element as that color; and
    (b) if the colors of the directly adjacent picture elements are different, comparing the individual picture elements of the next two adjacent pairs of picture elements of said adjacent scan lines on either side of the directly adjacent picture elements, and
    (i) if the colors of the individual picture elements of either pair of said next adjacent pairs are the same, and the two pairs are not of opposite colors, interpolating the interpolated picture element as that color;
    (ii) if the individual picture elements of each pair of said next adjacent pairs are the same and the two pairs are of opposite color, interpolating the interpolated picture element as a given color of said colors; and
    (iii) if neither one of the pairs of said adjacent pairs of picture elements comprises picture elements of the same color, comparing the picture elements of the two next most adjacent pairs of picture elements and repeating steps (i) to (iii) until at least one pair of the adjacent picture elements measured in sequence from the directly adjacent picture elements on both sides thereof is determined to comprise picture elements of the same color, and thereafter interpolating the interpolated picture element in accordance with steps (i) and (ii).

5. Apparatus for digital facsimile transmission and reception, said apparatus comprising:

transmitter means including means for scanning the image to be transmitted so as to produce a plurality of scan lines for transmission and for transmitting only alternative scan lines of the scanned image so that every other scan line is missing from the transmitted image;

and a receiver including receiving means for receiving the transmitted scan lines, and means for interpolating the missing scan lines between the transmitted scan lines;

said interpolating means comprising data processing means for comparing for each picture element of the scan line to be interpolated, the colors of the directly adjacent picture elements of the two adjacent transmitted scan lines between which the missing line is to be interpolated, and (a) if the colors of the directly adjacent picture elements are the same, interpolating the interpolated picture element as that color; and (b) if the colors of the directly adjacent picture elements are different, comparing the individual picture elements of the next two adjacent pairs of picture elements of said adjacent transmitted scan lines on either side of the directly adjacent picture elements, and (i) if the colors of the individual picture elements of either pair of said next adjacent pairs are the same, and the two pairs are not of opposite colors, interpolating the interpolated picture element as that color;

(ii) if the individual picture elements of each pair of said next adjacent pairs are the same and the two pairs are of opposite color, interpolating the interpolated picture element as a given color of said colors; and (iii) if neither one of the pairs of said adjacent pairs of picture elements comprises picture elements of the same color, comparing the picture elements of the two next most adjacent pairs of picture elements and repeating steps (i) to (iii) until at least one pair of the adjacent picture element measured in sequence from the directly adjacent picture elements on both sides thereof is determined to comprise picture elements of the same color, and thereafter interpolating the interpolated picture element in accordance with steps (i) and (ii).

6. Apparatus for digital facsimile transmission and reception as claimed in claim 5 wherein said apparatus further comprises facsimile printing means connected to said interpolating means.

7. Apparatus for digital facsimile transmission and reception as claimed in claim 5 wherein said apparatus further comprises a facsimile printer for printing the output of said interpolating means, and wherein said receiver means comprising a facsimile receiver, said data processing means comprising a central processing unit and said interpolating means further comprising an input peripheral interface adapter connected between said facsimile receiver and said central processor unit, a read only memory connected to said central processor unit, a random access memory connected to said central processing unit and an output peripheral interface adapter connected between said central processing unit and said facsimile printer.

8. Apparatus for digital facsimile transmission and reception as claimed in claim 7 wherein an input universal asynchronous receiver/transmitter is connected between the facsimile receiver and the central processing unit and an output universal asynchronous receiver/transmitter is connected between the central processing unit and the facsimile printer.

* * * * *